US011381657B2

(12) United States Patent
Dhanabalan et al.

(10) Patent No.: US 11,381,657 B2
(45) Date of Patent: Jul. 5, 2022

(54) ENHANCED FILE SHARING SYSTEMS AND METHODS

(71) Applicant: Citrix Systems, Inc., Fort Lauderdale, FL (US)

(72) Inventors: Praveen Raja Dhanabalan, Bangalore (IN); Anudeep Narasimhaprasad Athlur, Bangalore (IN); Nandikotkur Achyuth, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/376,026

(22) Filed: Apr. 5, 2019

(65) Prior Publication Data

US 2020/0322445 A1 Oct. 8, 2020

(51) Int. Cl.
*H04L 67/5681* (2022.01)
*H04L 67/04* (2022.01)
*H04L 67/06* (2022.01)

(52) U.S. Cl.
CPC .......... *H04L 67/2847* (2013.01); *H04L 67/04* (2013.01); *H04L 67/06* (2013.01)

(58) Field of Classification Search
CPC ...... H04L 67/2847; H04L 67/04; H04L 67/06
See application file for complete search history.

(56) References Cited

U.S. PATENT DOCUMENTS

| | | | | |
|---|---|---|---|---|
| 6,032,227 A * | 2/2000 | Shaheen | G06F 12/0813 | 711/129 |
| 8,499,066 B1 * | 7/2013 | Zhang | H04L 47/823 | 709/223 |
| 9,998,926 B1 | 6/2018 | Gale et al. | | |
| 10,079,885 B1 * | 9/2018 | Chaboud | H04L 67/1097 | |
| 10,225,365 B1 | 3/2019 | Hotchkies et al. | | |
| 10,735,891 B1 * | 8/2020 | Trim | H04W 4/70 | |
| 10,812,426 B1 * | 10/2020 | Gregg | A61B 5/0022 | |
| 2002/0080816 A1 * | 6/2002 | Spinar | H04W 28/20 | 370/449 |

(Continued)

FOREIGN PATENT DOCUMENTS

| | | |
|---|---|---|
| WO | WO2016123497 A1 * | 1/2016 |
| WO | 2016209490 A1 | 12/2016 |

OTHER PUBLICATIONS

"ShareFile Enterprise Technical Overview" Citrix, 2015, 10 pages.

(Continued)

*Primary Examiner* — Chris Parry
*Assistant Examiner* — Steven C Nguyen
(74) *Attorney, Agent, or Firm* — Finch & Maloney PLLC

(57) ABSTRACT

A computer system is provided. The computer system can include a memory, a network interface, and at least one processor coupled to the memory and the network interface. The at least one processor can be configured to identify a file to provide to a computing device; predict a geolocation at which the computing device is to request access to the file; predict a network bandwidth to be available to the computing device at the geolocation; determine, based on the file and the network bandwidth, a first portion of the file to store in a cache of the computing device; and download, via the network interface, the first portion of the file to the cache.

20 Claims, 6 Drawing Sheets

(56) References Cited

U.S. PATENT DOCUMENTS

| | | | | |
|---|---|---|---|---|
| 2009/0007196 | A1* | 1/2009 | Ganesan | H04N 7/163<br>725/87 |
| 2012/0023226 | A1* | 1/2012 | Petersen | H04W 4/18<br>709/224 |
| 2014/0059156 | A1* | 2/2014 | Freeman, II | H04L 63/061<br>709/213 |
| 2014/0095943 | A1 | 4/2014 | Kohlenberg et al. | |
| 2014/0233472 | A1* | 8/2014 | Kadel | H04W 28/26<br>370/329 |
| 2015/0172216 | A1* | 6/2015 | Bellizia | H04L 47/826<br>709/226 |
| 2016/0255172 | A1* | 9/2016 | Gibbon | H04L 67/02<br>709/201 |
| 2016/0295551 | A1* | 10/2016 | Vetter | H04L 63/08 |
| 2017/0099327 | A1* | 4/2017 | Negalaguli | H04L 67/42 |
| 2017/0181027 | A1* | 6/2017 | Raleigh | H04W 48/18 |
| 2017/0279914 | A1* | 9/2017 | Bishop | H04L 65/4084 |
| 2018/0176325 | A1* | 6/2018 | Liang | H04L 67/02 |
| 2018/0191801 | A1* | 7/2018 | Chen | H04L 65/608 |
| 2018/0241684 | A1* | 8/2018 | Meredith | H04L 43/0876 |
| 2018/0248663 | A1* | 8/2018 | Mueller | H04B 7/0452 |
| 2020/0358523 | A1* | 11/2020 | Mehrabanzad | H04L 67/02 |

OTHER PUBLICATIONS

“ShareFile Enterprise: Security Whitepaper”, Citrix, 2014, 34 pages.

PCT International Search Report and Written Opinion for Application No. PCT/US2020/026780 dated Jul. 10, 2020, 14 pages.

* cited by examiner

ENHANCED FILE SHARING SYSTEMS AND METHODS

BACKGROUND

Distributed file sharing systems enable users to access files for a variety of purposes at various locations. Most file sharing systems implement a user interface that allows users to upload files to a central repository and to share those files among their own devices and/or with other users. Shared files can be reviewed, checked-out, edited, or otherwise accessed within the central repository. Copies of shared files can also be downloaded from the central repository to local repositories on one or more client devices. To keep the copies of the files stored in the local repositories in synchrony with the copy of the file stored in the central repository, some distributed file sharing systems, such as the Citrix ShareFile® file sharing system, implement automatic synchronization features. Once properly configured, these features automatically maintain, within the local repositories, copies of files stored in the central repository.

SUMMARY

In some examples, a computer system is provided. In these examples, the computer system can include one or more of the following features. The computer system can include a memory, a network interface, and at least one processor coupled to the memory and the network interface. The at least one processor can be configured to identify a file to provide to a computing device; predict a geolocation at which the computing device is to request access to the file; predict a network bandwidth to be available to the computing device at the geolocation; determine, based on the file and the network bandwidth, a first portion of the file to store in a cache of the computing device; and download, via the network interface, the first portion of the file to the cache.

In the computer system, the at least one processor can be further configured to receive the file; receive a request to share the file with a user; and identify an association between the user and the computing device, wherein the at least one processor is configured to identify the file to provide to the computing device in response to receiving the file and/or receiving the request to share the file. The at least one processor can be configured to predict the network bandwidth by identifying the network bandwidth within output from a bandwidth prediction process. The bandwidth prediction process can include a machine learning process trained using historical data representative of network bandwidth, a probability distribution function derived from the historical data representative of network bandwidth, an identification process that accesses a cross-reference associating geolocations with network bandwidths. The historical data representative of network bandwidth can be filtered to include data specific to the user and/or peers of the user.

In the computer system, the at least one processor can be configured to predict the geolocation by identifying the geolocation within output from a geolocation prediction process. The geolocation prediction process can include a machine learning process trained using historical data representative of file access, a probability distribution function derived from the historical data representative of file access, and/or an interoperation that identifies the geolocation with a schedule of a user associated with the computing device. The historical data representative of file access can be filtered to include data specific to the user, peers of the user, and/or files related to the file.

In the computer system, the at least one processor can be configured to determine the first portion of the file to store in the cache by being configured to identify a processing rate of an application used to access to the file; determine a second portion of the file that can be downloaded to the geolocation having the network bandwidth within a period of time required to process the first portion of the file at the processing rate; and identify the first portion of the file as being a portion of the file other than the second portion of the file. The file can be a video file.

The computer system can further include the computing device associated with the user. The computing device can include one or more processors. The one or more processors can be configured to receive a message to download the first portion of the file; determine an amount of unallocated storage available in the cache; determine whether the amount of unallocated storage is sufficient to store the first portion of the file; identify, in response to determining that the amount of unallocated storage is insufficient to store the first portion of the file, data stored in the cache having a size sufficient to store, in combination with the amount of unallocated storage, the first portion of the file; and delete the data from the cache. The one or more processors can be configured to identify the data stored in the cache at least in part by identifying data of a previously accessed file.

In some examples, a method of managing cached data is provided. In these examples, the method can include one or more of the following acts. The method can include acts of receiving a file at a first computing device; receiving a request to share the file with a user; identifying an association between the user and a second computing device; predicting a geolocation at which the second computing device is to request access to the file; predicting a network bandwidth to be available to the second computing device at the geolocation; determining, based on the file and the network bandwidth, a first portion of the file to store in a cache of the second computing device; and downloading the first portion of the file to the cache.

In the method, the act of predicting the network bandwidth can include an act of identifying the network bandwidth within output from a bandwidth prediction process. The act of identifying the network bandwidth can include executing a machine learning process trained using historical data representative of network bandwidth, evaluating a probability distribution function derived from the historical data representative of network bandwidth, and/or identifying the network bandwidth within a cross-reference associating geolocations with network bandwidths. The act of predicting the geolocation can include an act of identifying the geolocation within output from a geolocation prediction process. The act of identifying the geolocation within the output can include executing a machine learning process trained using historical data representative of file access, evaluating a probability distribution function derived from the historical data representative of file access, and/or identifying the geolocation within a schedule of the user. The act of executing the machine learning process can include an act of executing a machine learning process trained using historical data representative of file access initiated by a device associated with the user and/or a peer of the user. The act of determining the first portion of the file to store in the cache can include acts of identifying a processing rate of an application used to access to the file; determining a second portion of the file that can be downloaded to the geolocation having the network bandwidth within a period of time required to process the first portion of the file at the processing rate; and identifying the first portion of the file as being a portion of the file other than the second portion of the file. The act of receiving the file can include an act of receiving a video file.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
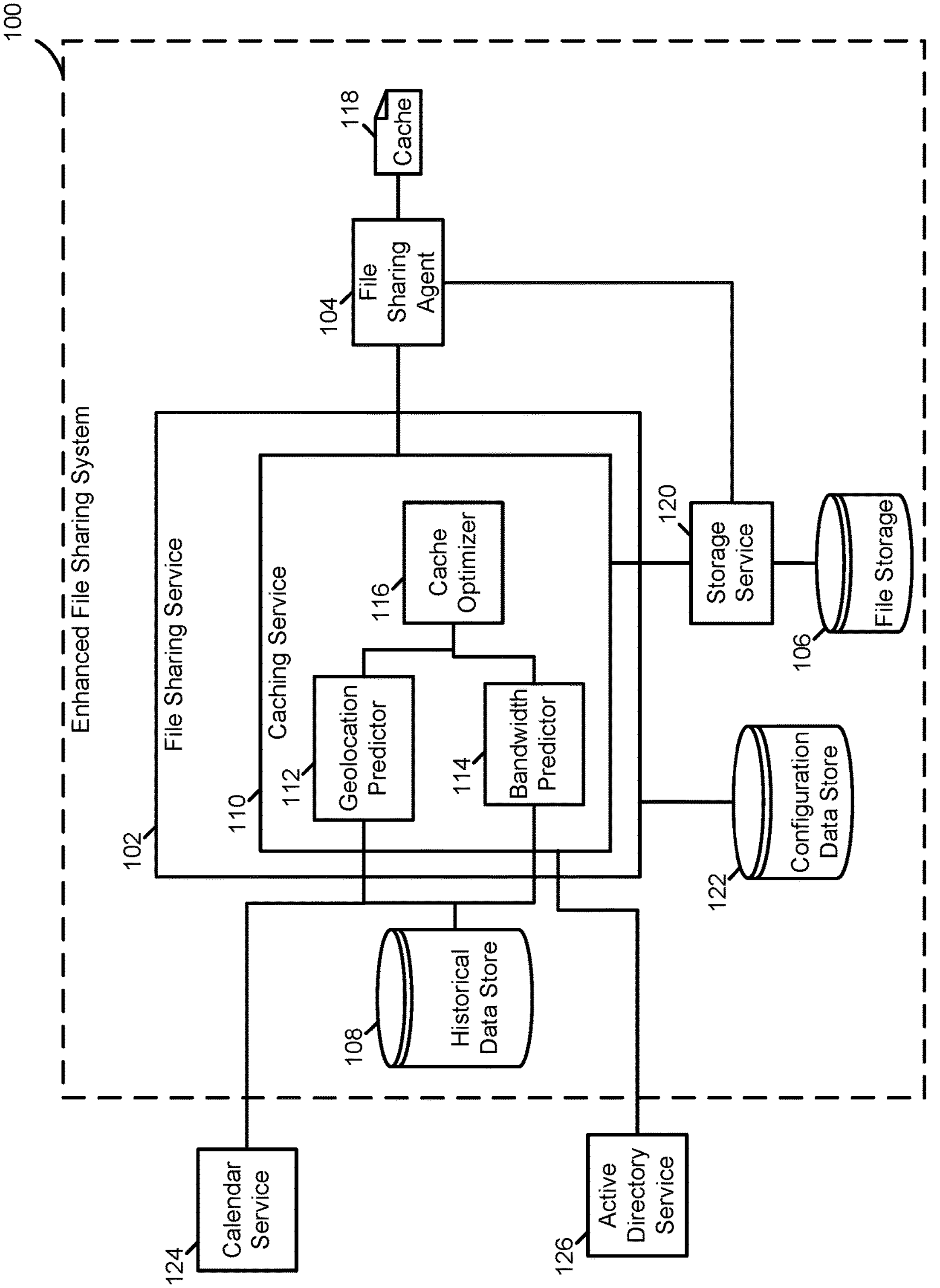
FIG. 1 is a block diagram of an enhanced file sharing system with predictive caching in accordance with an example of the present disclosure.

As summarized above, various examples described herein are directed to predictive caching systems and methods for use in an enhanced file sharing system. These systems and methods overcome technical difficulties that arise in other file sharing systems where, for example, a local repository of a client device has insufficient storage available to store complete copies of automatically synchronized files. In these situations, file sharing systems are unable to store complete copies of at least some of the files within the local repository.

To address this issue, some file sharing systems create one or more "ghost files" or partially cached files within the local repository. These abbreviated versions of the file are complete files from the point of view of the operating system but contain only some or none of the data of the file stored in a central repository of the file sharing system. When the abbreviated version is accessed, the file sharing system downloads the remainder of the data, thereby creating a complete local copy of the file. However, downloading the remainder of the data can cause undesirable delay and frustrated users where there is insufficient network bandwidth available to complete the download in a timely manner.

Thus, and in accordance with at least some examples disclosed herein, enhanced file sharing systems and methods are provided. These systems and methods preserve the quality of a user's experience by managing the latency perceived by the user when accessing files. In some examples, the enhanced file sharing system predicts a geographic location (i.e., a geolocation) at which the user will access a file. In these examples, the enhanced file sharing system also predicts a bandwidth available to download the file at the predicted geolocation. Based on these predictions and characteristics of the file, the enhanced file sharing system stores enough data within an abbreviated version of the file to allow an application to process the file within an acceptable period of latency. In some examples, the acceptable period of latency can be no latency whatsoever. However, in other examples, the acceptable period of latency can be 1 second or up to several seconds.

In certain examples, the enhanced file sharing systems predicts the geolocation and/or the bandwidth of file access with reference to historical file access patterns of the user and/or a group of peers of the user. For instance, in some examples, the enhanced file sharing system records, for each instance of a file being accessed an identifier of the file being accessed, an identifier of the user accessing the file, an identifier of a client device accessing the file, an identifier of the geolocation of access, and an identifier of the average bandwidth available to download the file from a central data storage to a local cache on the client device. These records can be used to predict the geolocation and/or bandwidth of future file access using a variety of approaches.

For instance, in some examples, the enhanced file sharing system periodically calculates an average bandwidth at which a file has been downloaded by the peer group and records, within configuration data maintained by the enhanced file sharing system, the average bandwidth as a predicted bandwidth associated with the file. In other examples, the enhanced file sharing system periodically calculates an average bandwidth for each geolocation at which a file has been downloaded by the peer group and separately identifies a most frequent geolocation at which the peer group has access the file. In these examples, the enhanced file sharing system records the average bandwidth at the most frequent geolocation as the predicted bandwidth associated with the file. In other examples, the enhanced file sharing system includes an artificial neural network trained to predict bandwidth available at one or more geolocations. In these examples, the enhanced file sharing system identifies the most frequent geolocation at which the user has accessed a file having or including the same name as the file and/or residing in the same directory as the file and provides the most frequent geolocation as input to the artificial neural network. In these examples, the enhanced file sharing system records the bandwidth output by the artificial neural network as the predicted bandwidth associated with the file. In other examples, other machine learning processes, both supervised and unsupervised, can be trained to predict bandwidth using, as input, any combination of an identifier of a file accessed, an identifier of a user accessing the file, an identifier of a client device accessing the file, an identifier of a geolocation of access, and an identifier of the average bandwidth available to download the file. As will be understood in view of this disclosure, a vast number of other approaches to predicting bandwidth and/or geolocation (e.g., regression, moving average, exponential smoothing, etc.) can be implemented within the enhanced file sharing system disclosed herein.

In some examples, the enhanced file sharing system uses the predicted bandwidth and the characteristics of the file to identify a focal point within the file between a starting point and an ending point such that the time required for an application to process the data between the starting point and the focal point equals an amount of time required to download the data between the focal point and the ending point. Once the focal point of a given file is identified, the enhanced file sharing system can download, to a local cache in a client device associated with a user, an abbreviated version of the file including data between the starting point and the focal point.

In certain examples, the position of a focal point for a given file depends not only on the predicted bandwidth available to download the file but also on the type and amount of data stored in the file. For example, certain types of files contain portions of data (e.g., video and/or audio data) that can be processed by an application while other portions of the file are downloaded. For these types of files, the enhanced file sharing system can identify a focal point closer to the starting point of the file than for types of files where the application requires a complete copy of the file to initiate processing.

In some examples, the enhanced file sharing system periodically, or in response to an event, reorganizes the local cache to enhance its operation. This event can be, for example, an attempt to automatically synchronize a new file between a central file storage of the enhanced file sharing system and the local cache of a client device. In some examples, the enhanced file sharing system deletes or overwrites files stored in the local cache where the size of the local cache is insufficient to store even an appropriately sized abbreviate version of a file targeted for automatic synchronization. In some examples, the enhanced file sharing system maintains the local cache as a first-in, first-out queue in which files that are stored first are also deleted first. In other examples, the enhanced file sharing system prioritizes retention using recency and/or frequency of access with more recently and/or frequently accessed files being retained over less recently and/or infrequently accessed files. In still other examples, the enhanced file sharing system prioritizes retention using predicted bandwidth with files associated with lower bandwidth being retained over files associated with higher bandwidth. As will be understood in view of this disclosure, a number of other approaches to prioritizing file retention can be implemented within the enhanced file sharing system disclosed herein.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Enhanced File Sharing System

In some examples, an enhanced file sharing system is configured to implement predictive file caching to manage any latency perceived by the user when accessing files targeted for automatic synchronization. FIG. 1 illustrates a logical architecture of an enhanced file sharing system 100 in accordance with some examples. As shown, the system 100 includes a file sharing service 102, a file sharing agent 104, a file storage service 120, a centralized file storage 106, a configuration data store 122, an historical data store 108, and a local cache 118. The sharing service 102 includes a caching service 110. The caching service 110 includes a geolocation predictor 112, a bandwidth predictor 114, and a cache optimizer 116. Also depicted in FIG. 1 are an active directory service 126 and a calendar service 124.

In some examples, the sharing service 102 is configured to implement a set of enterprise file sharing features. This set of features can include file-related features (e.g., file uploading, file storage, file downloading, file sharing, file synchronization, etc.), security features (e.g., encryption, user authentication, device authentication, etc.), and analytical features (e.g., tracking usage of the system 100, calculating and provide metrics descriptive of usage, etc.). As illustrated in FIG. 1, the sharing service 102 is configured to implement this feature set by executing a variety of processes, including processes that involve communications with the agent 104, the storage service 120, and the historical data store 108.

In some examples, the sharing service 102 is configured to communicate with the agent 104, the storage service 120, and the historical data store 108 by exchanging (i.e., transmitting and/or receiving) messages via one or more system interfaces (e.g., a web service application program interface (API), a web server interface, fibre channel interface, etc.). For instance, in some examples, one or more server processes included within the sharing service 102 exchange messages with various types of client processes via the systems interfaces. These client process can include browsers and/or more specialized programs—such as the agent 104.

In certain examples, the messages exchanged between the sharing service 102 and a client process can include requests for authorization to upload, download, share, and/or synchronize files. The messages can also include requests to authenticate users or devices and/or requests to configure features supported by the sharing service 102.

In these examples, the sharing service 102 is configured to respond to reception of an authorization request by communicating with the storage service 120 to determine, via a set of rules, whether an operation identified in the request is allowable. Further, in these examples, the sharing service 102 is configured to notify the client process (e.g., the agent 104) of the allowability of the requested operation via a response. In addition, the sharing service 102 is configured to maintain the historical data store 108 where the sharing service 102 receives a message from the storage service 120 that an authorized operation was successfully executed. The historical data store 108 is configured to store usage data consisting of records of each instance of file access involving the system 100. Records stored in the historical data store 108 can include an identifier of the file accessed, an identifier of a user accessing the file, an identifier of a client device accessing the file, an identifier of a geolocation of access, and an identifier of the average bandwidth available to download the file. In some examples, the identifier of the geolocation can include or be improved by global position system coordinates and/or network information (e.g., internet protocol address of a connected network forwarding device).

In some examples, the sharing service 102 is configured to respond to reception of an authentication request by communicating with an authentication service (e.g., the active directory service 126 of FIG. 1) to determine, via a set of rules, whether an entity (e.g., a user or device) identified in the authentication request is authorized to access the system 100. Further, in these examples, the sharing service 102 is configured to notify, via a response message, the client process as to whether the entity is authorized to access the system 100.

In some examples, the sharing service 102 is configured to respond to reception of a request to change its configuration by determining, via a set of rules, whether the change is allowable. Further, in these examples, the sharing service 102 is configured to execute the change where the change is allowable and notify the client process of the allowability and result of the requested change via a response. In at least one example, the sharing service 102 is configured to execute configuration changes by storing configuration data in the configuration data store 122. This configuration data can, for example, associate features (e.g., an automatic synchronization feature) with users, files, and file directories.

In some examples, the storage service 120 is configured to manage the file storage 106. The file storage 106 is configured to store files serviced by the system 100. In some examples, the storage service 120 is configured to implement and expose a system interface (API) through which the other components of the system 100 access the file storage 106 and data descriptive of the files stored therein. For example, where the storage service 120 receives a request to execute an authorized, file-related operation, the storage service 120 responds to reception of the request by processing the request and notifying the requestor and the file sharing service 102 of the operations results. Further, in some examples, the storage service 120 is configured to load balance requests and responses received via the system interface. More details regarding processes executed by the storage service 120, in some examples, are articulated below with reference to FIG. 5.

In some examples, the agent 104 is a specialized client program configured to execute on a client device. The agent 104 manages the local cache 118. As shown in FIG. 1, the agent 104 is configured to interoperate with the sharing service 102 to implement the file-related and security features described above. In these examples, the agent 104 exchanges messages with the sharing service 102 via the system interfaces described above. The messages can include requests for authorization, authentication, and/or configuration as described above. Such messages can be generated, for example, by interaction between a user and a user interface provided by the agent 104.

In some examples, the agent 104 is configured to receive and process responses to authorization requests. These responses can, for example, authorize the agent 104 to execute a file-related operation, such as an upload, download, share, and/or synchronization. In response to receiving and processing an authorization response, the agent 104 can exchange messages with the storage service 120 to execute the authorized file-related operation. For instance, where the agent 104 receives a response authorizing download of a file, the agent 104 can exchange messages with the storage service 120 to request and receive the file as stored in the file storage 106. Conversely, where the agent 104 receives a response authorizing upload of a file, the agent 104 can exchange messages with the storage service 120 to transmit the file to the file storage 106.

In at least one example, where the sharing service 102 supports an automatic synchronization feature, the agent 104 exchanges messages with the sharing service 102 to configure the sharing service 102 to automatically synchronize a targeted file shared with a particular user. When executing the automatic synchronization feature, the sharing service 102, the agent 104, and the file storage 106 interoperate with one another to automatically maintain, within the cache 118, copies of any files targeted for automatic synchronization. In some examples, the sharing service 102 utilizes the caching service 110 to implement predictive caching within the cache 118. In these examples, the sharing service 102 invokes predictive caching by communicating a request to the caching service 110. This request can include an identifier of a targeted file or directory and an identifier of a user with whom the target file or directory is shared.

As shown in FIG. 1, caching service 110 includes the geolocation predictor 112, the bandwidth predictor 114, and the optimizer 116. In some examples, these components interoperate to identify an optimal portion of the targeted file to store on one or more client devices associated with the identified user. In these examples, the caching service 110 is configured to receive the requests from the sharing service 102 to execute predictive caching. In response to reception of these requests, the caching service 110 orchestrates operation of the geolocation predictor 112, the bandwidth predictor 114, and the cache optimizer 116 to determine the optimal portion. Further, in response to requests for predictive caching, the caching service 110 is configured to interoperate with the storage service 120 and the agent 104 to coordinate downloads of the optimal portion.

In some examples, the geolocation predictor 112 is configured identify a predicted geolocation at which the user is most likely to access the targeted file. For example, the geolocation predictor 112 can be configured to receive, process, and respond to requests generated by the caching service 110. These requests can include the identifier of the user (and/or client device(s) associated with the user) and the identifier of the targeted file. The geolocation predictor 112 can be configured to execute, in response to these requests, a prediction process to predict the geolocation at which the user is most likely to access the targeted file via an associated client device. The responses provided by the geolocation predictor 112 can include an identifier of the predicted geolocation. More details regarding prediction processes executed by the geolocation predictor 112, in some examples, are articulated below with reference to FIG. 5.

In some examples, the bandwidth predictor 114 is configured to identify an amount of bandwidth available at the predicted geolocation to download the targeted file. For example, the bandwidth predictor 114 can be configured to receive, process, and respond to requests generated by the caching service 110. These requests can include an identifier of the predicted geolocation. The bandwidth predictor 114 can be configured to execute, in response to these requests, a prediction process. The responses provided by the bandwidth predictor 114 can include an amount of predicted bandwidth. More details regarding prediction processes executed by the bandwidth predictor 114, in some examples, are articulated below with reference to FIG. 5.

Both the geolocation predictor 112 and the bandwidth predictor 114 are configured to execute one or more prediction processes. The specifics of the prediction process executed by the predictors 112 and 114 varies between examples. Furthermore, any suitable prediction and/or forecasting technique can be executed by either of the predictors 112 and 114 without departing from the scope of this disclosure. As shown in FIG. 1, the geolocation predictor 112 and the bandwidth predictor 114 are separate processes. However, examples of the system 100 are not limited to this architecture. For instance, in some examples, the geolocation predictor 112 and the bandwidth predictor 114 are a unified prediction component that uses some or all of the data used by the geolocation predictor 112 and the bandwidth predictor 114 separately to predict a bandwidth available to download the targeted file. In addition, FIG. 1 illustrates only one agent 104, but examples of the system 100 are not limited to any particular number of agents.

In some examples, the optimizer 116 is configured to determine a portion of the file to download and store in the cache 118 so as to decrease any latency experienced by the user in accessing the file to an acceptable amount. For example, the optimizer 116 can be configured to receive, process, and respond to requests generated by the caching service 110. These requests can include a predicted bandwidth, the identifier of the file, the identifier of the user, and/or the identifier of the client device(s) associated with user. The optimizer 116 can be configured to execute, in response to these requests, an optimization process. The responses provided by the optimizer 116 to the cache service 110 can include a message with data indicating the results of the optimization process. More details regarding optimization processes executed by the optimizer 116, in some examples, are articulated below with reference to FIG. 5.

Figure 2:
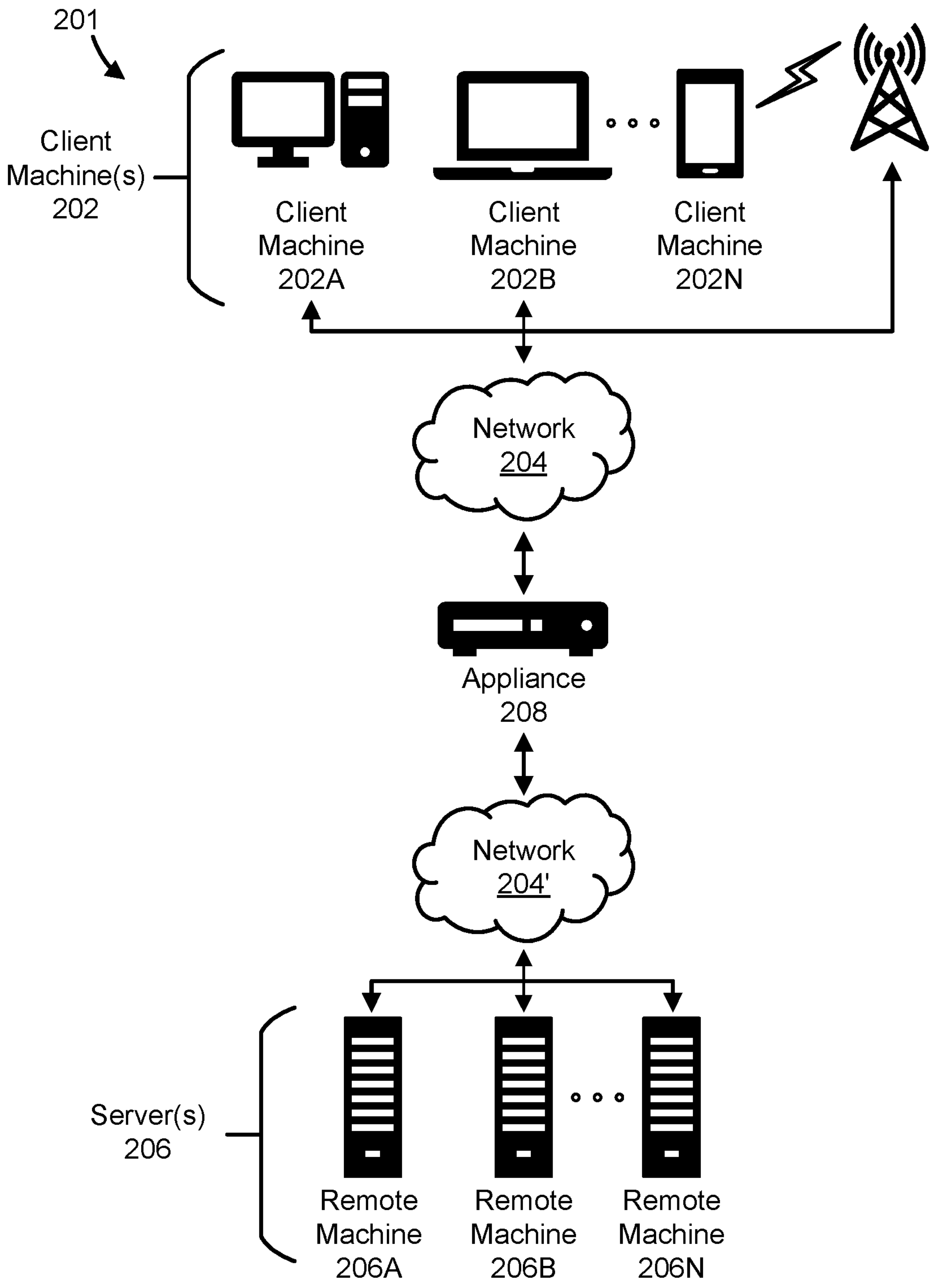
FIG. 2 is a block diagram of a network environment of computing devices in which various aspects of the present disclosure can be implemented.

Referring to FIG. 2, a non-limiting network environment 201 in which various aspects of the disclosure can be implemented includes one or more client machines 202A-202N, one or more remote machines 206A-206N, one or more networks 204, 204', and one or more appliances 208 installed within the computing environment 201. The client machines 202A-202N communicate with the remote machines 206A-206N via the networks 204, 204'. The computing environment 201 can also be referred to as a distributed computer system.

In some examples, the client machines 202A-202N communicate with the remote machines 206A-206N via an intermediary appliance 208. The illustrated appliance 208 is positioned between the networks 204, 204' and may also be referred to as a network interface or gateway. In some examples, the appliance 208 can operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some examples, multiple appliances 208 can be used, and the appliance(s) 208 can be deployed as part of the network 204 and/or 204'.

The client machines 202A-202N may be generally referred to as client machines 202, local machines 202, clients 202, client nodes 202, client computers 202, client devices 202, computing devices 202, endpoints 202, or endpoint nodes 202. The remote machines 206A-206N may be generally referred to as servers 206 or a server farm 206. In some examples, a client device 202 can have the capacity to function as both a client node seeking access to resources provided by a server 206 and as a server 206 providing access to hosted resources for other client devices 202A-202N. The networks 204, 204' may be generally referred to as a network 204. The networks 204 can be configured in any combination of wired and wireless networks.

A server 206 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 206 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 206 can execute a remote presentation services program or other program that uses a thin client or a remote-display protocol to capture display output generated by an application executing on a server 206 and transmit the application display output to a client device 202.

In yet other examples, a server 206 can execute a virtual machine providing, to a user of a client device 202, access to a computing environment. The client device 202 can be a virtual machine. The virtual machine can be managed by, for example, a hypervisor, a virtual machine manager (VMM), or any other hardware virtualization technique within the server 206.

In some examples, the network 204 can be: a local area network (LAN); a metropolitan area network (MAN); a wide area network (WAN); a primary public network 204;

and a primary private network 204. Additional examples can include a network 204 of mobile telephone networks that use various protocols to communicate among mobile devices. For short range communications within a wireless local-area network (WLAN), the protocols can include 802.11, Bluetooth, and Near Field Communication (NFC).

Figure 3:
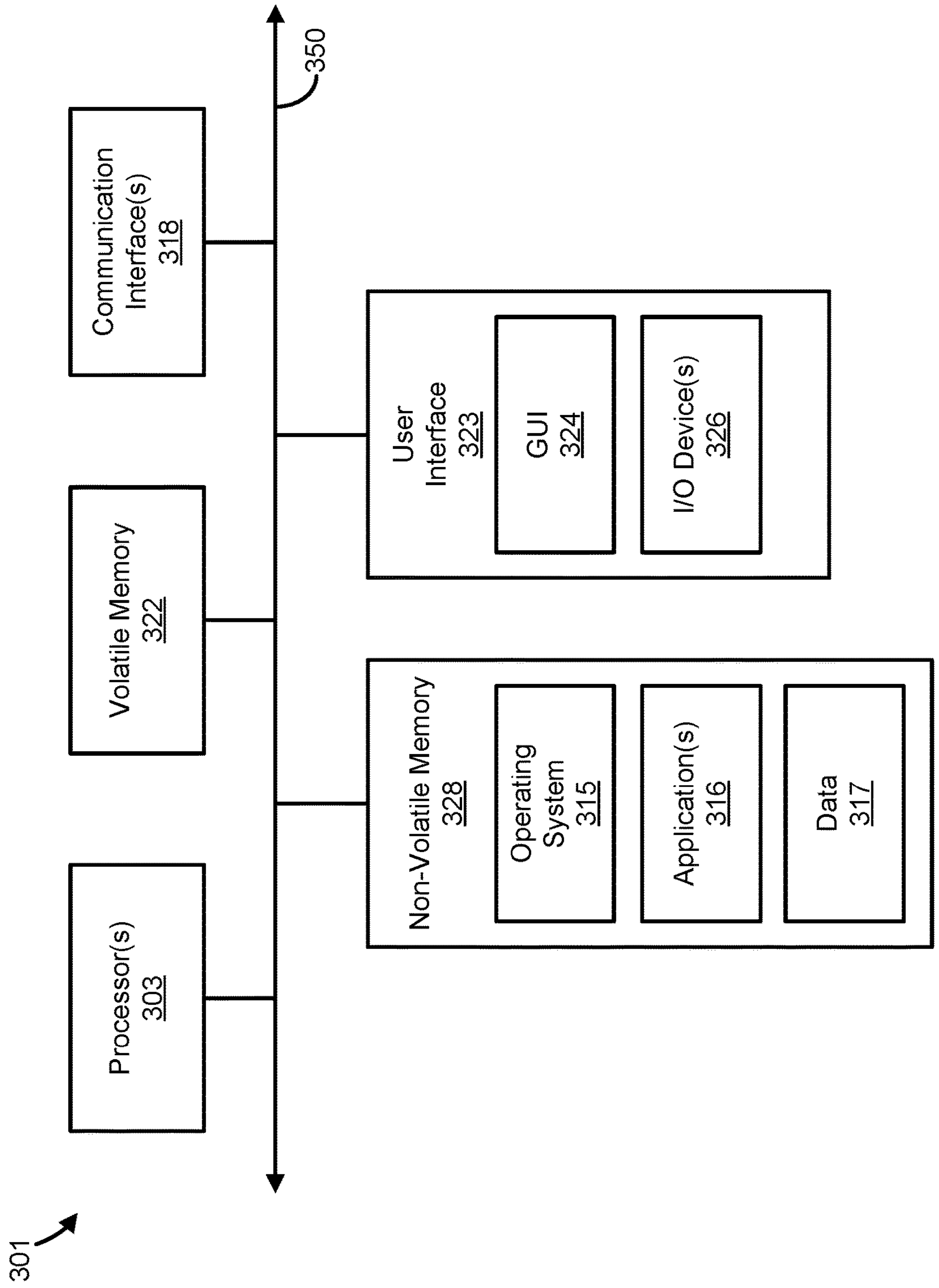
FIG. 3 is a block diagram of a computing device that can implement one or more of the computing devices of FIG. 2 in accordance with an example of the present disclosure.

FIG. 3 depicts a block diagram of a computing device 301 useful for practicing an example of client devices 202, appliances 208 and/or servers 206. The computing device 301 includes one or more processors 303, volatile memory 322 (e.g., random access memory (RAM)), non-volatile memory 328, user interface (UI) 323, one or more communications interfaces 318, and a communications bus 350. One or more of the computing devices 301 may also be referred to as a computer system.

The non-volatile memory 328 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 323 can include a graphical user interface (GUI) 324 (e.g., a touchscreen, a display, etc.) and one or more input/output (I/O) devices 326 (e.g., a mouse, a keyboard, a microphone, one or more speakers, one or more cameras, one or more biometric scanners, one or more environmental sensors, and one or more accelerometers, etc.).

The non-volatile memory 328 stores an operating system 315, one or more applications 316, and data 317 such that, for example, computer instructions of the operating system 315 and/or the applications 316 are executed by processor(s) 303 out of the volatile memory 322. In some examples, the volatile memory 322 can include one or more types of RAM and/or a cache memory that can offer a faster response time than a main memory. Data can be entered using an input device of the GUI 324 or received from the I/O device(s) 326. Various elements of the computing device 301 can communicate via the communications bus 350.

The illustrated computing device 301 is shown merely as an example client device or server and can be implemented by any computing or processing environment with any type of machine or set of machines that can have suitable hardware and/or software capable of operating as described herein.

The processor(s) 303 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 303 can be analog, digital or mixed. In some examples, the processor 303 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The communications interfaces 318 can include one or more interfaces to enable the computing device 301 to access a computer network such as a Local Area Network (LAN), a Wide Area Network (WAN), a Personal Area Network (PAN), or the Internet through a variety of wired and/or wireless connections, including cellular connections.

In described examples, the computing device 301 can execute an application on behalf of a user of a client device. For example, the computing device 301 can execute one or more virtual machines managed by a hypervisor. Each virtual machine can provide an execution session within which applications execute on behalf of a user or a client device, such as a hosted desktop session. The computing device 301 can also execute a terminal services session to provide a hosted desktop environment. The computing device 301 can provide access to a remote computing environment including one or more applications, one or more desktop applications, and one or more desktop sessions in which one or more applications can execute.

Additional descriptions of a computing device 301 configured as a client device 202 or as a server 206, or as an appliance intermediary to a client device 202 and a server 206, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 4:
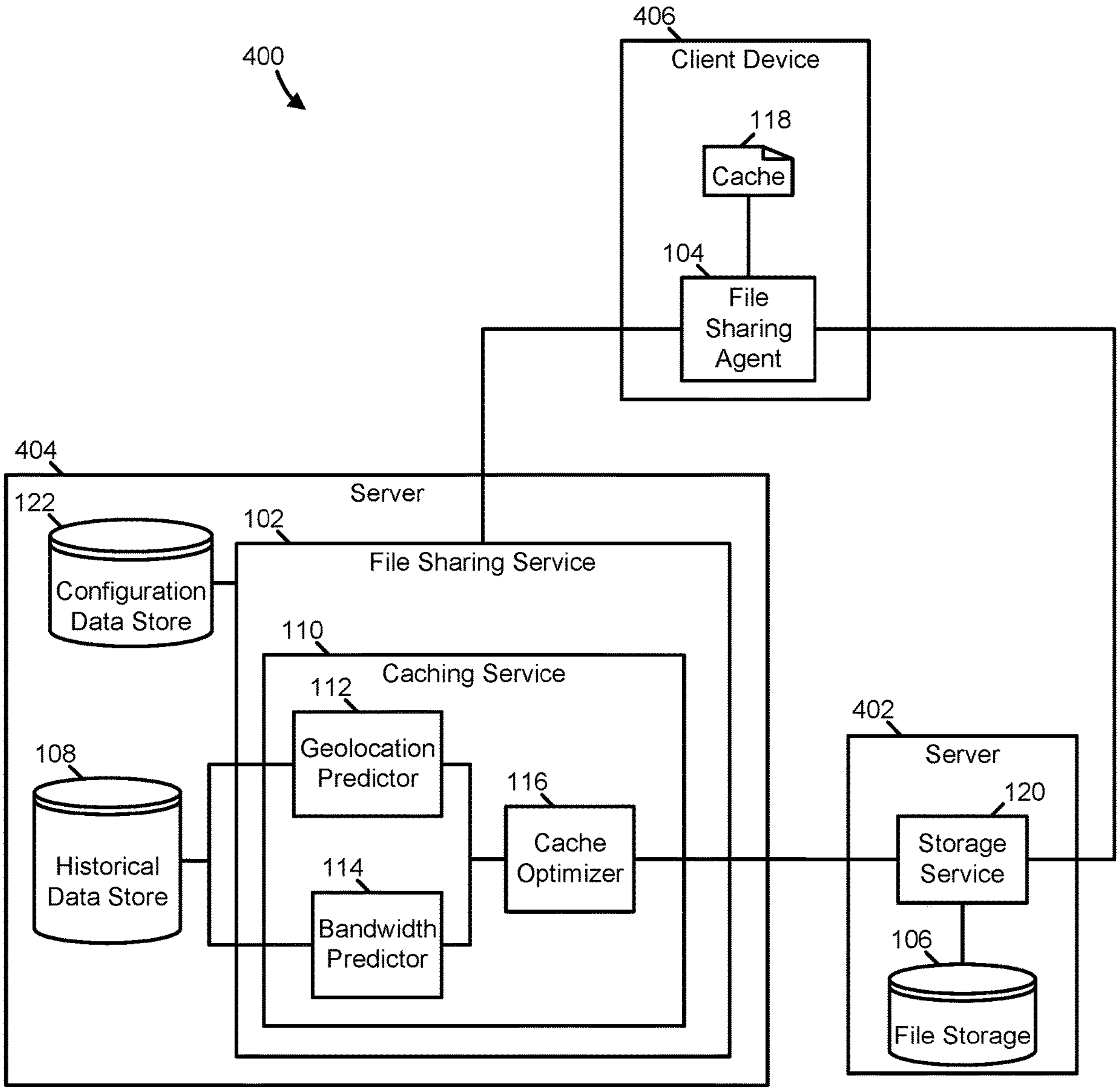
FIG. 4 is a block diagram of the file sharing system of FIG. 1 as implemented by a specific configuration of computing devices in accordance with an example of the present disclosure.

FIG. 4 illustrates an enhanced file sharing system (e.g., the system 100 of FIG. 1) configured for operation within a distributed computing platform (e.g. the network environment 201 of FIG. 2). As shown in FIG. 4, the configuration 400 includes a server computer 402, a server computer 404, and a client device 406. Within the configuration 400, the computing devices 402, 404, and 406 are communicatively coupled to one another and exchange data via a network (e.g., the networks 204 and 204' of FIG. 2).

As shown in FIG. 4, the server 402 hosts the storage service 120 and the file storage 106. The server 404 hosts the sharing service 102 and the historical data store 108. The client device 406 hosts the agent 104 which maintains the cache 118. Many of the components illustrated in FIG. 4 are described above with reference to FIG. 1. For purposes of brevity, those descriptions will not be repeated here, but each of the components of FIG. 1 included in FIG. 4 are structured and function in FIG. 4 as described in FIG. 1.

The configuration 400 is but one example of many potential configurations that can be used to implement the system 100. For example, in some examples, the server 404 hosts the file sharing service 102, the historical data store 108, the storage service 120, the configuration data store 122 and the file storage 106. However, in other examples, a server distinct from the servers 402 and 404 hosts the historical data store 108 and yet another distinct server hosts the bandwidth predictor 114. As such, the examples disclosed herein are not limited to the configuration 400 and other configurations are considered to fall within the scope of this disclosure.

Enhanced File Sharing Processes

Figure 5:
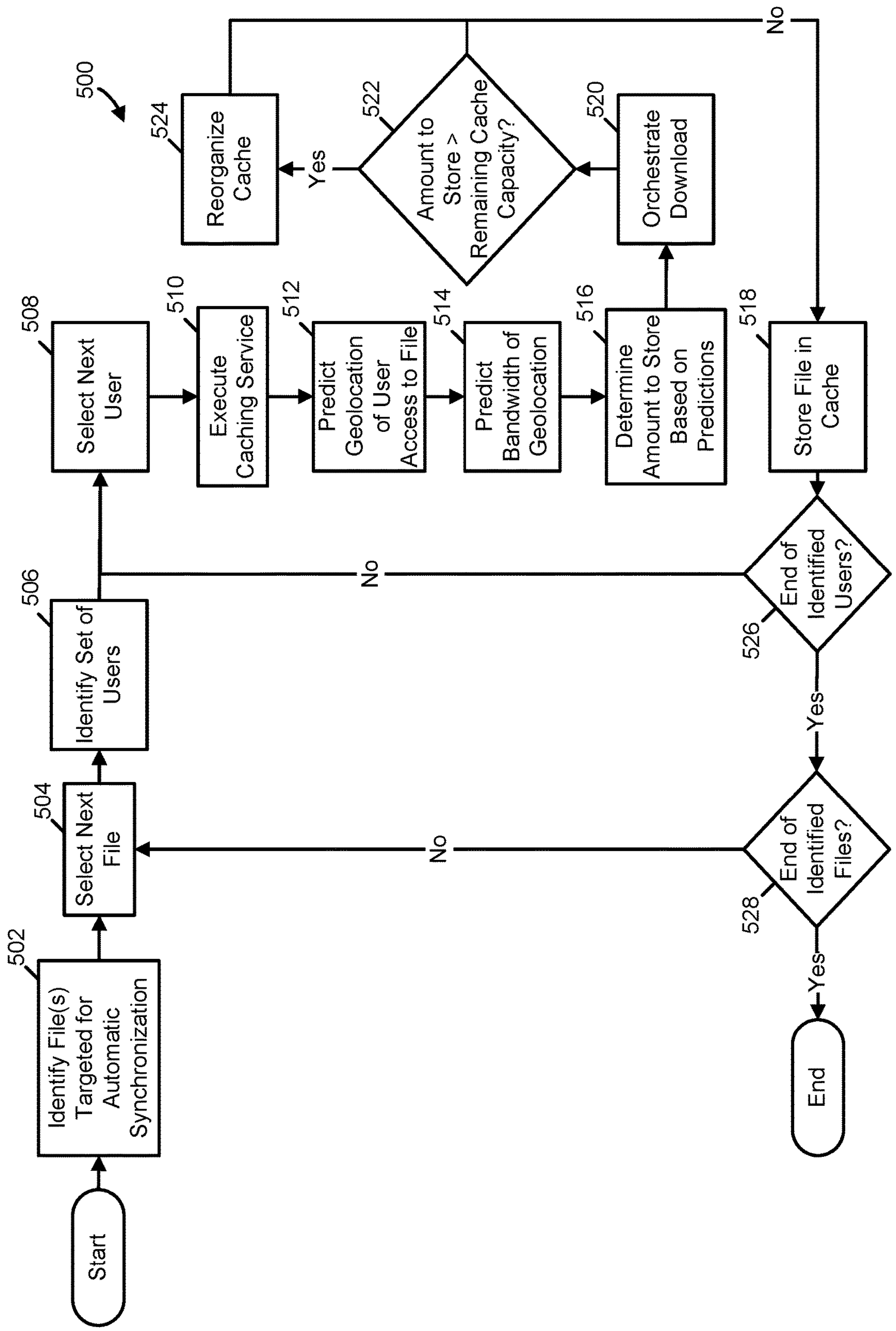
FIG. 5 is a flow diagram of a predictive caching process in accordance with an example of the present disclosure.

As described above, some examples of the system 100 of FIG. 1 are configured to execute enhanced file sharing and predictive caching processes. FIG. 5 illustrates one example of a predictive caching process 500 executed by the system 100 in some examples. The process 500 can be executed in response to events including, for example, expiration of a periodic timer and/or receipt of an ad-hoc request generated by a user interface. In some examples, the ad-hoc request can be generated in response to receiving a file within a directory targeted for automatic synchronization, in response to receiving a request to share such a file, and/or in response to receiving a configuration request that targets a file and/or a directory for automatic synchronization.

The process 500 starts with a sharing service (e.g., the sharing service 102 of FIG. 1) identifying 502 a set of files targeted for automatic synchronization. In some examples, the sharing service identifies 502 files targeted for automatic synchronization by searching a configuration data store (e.g., the configuration data store 122 of FIG. 1) for associations between files and/or directories and an identifier of the automatic synchronization feature. In response to finding such associations, the sharing service targets the associated files and/or files within the directories for automatic synchronization.

Continuing the process 500, the sharing service selects 504 a next targeted file. The sharing service identifies 506 (e.g., within the configuration data store) a set of users who have enabled automatic synchronization of the targeted file. The sharing service selects 508 the next user and identifies (e.g., within the configuration data) one or more associations between the selected user and one or more client devices. To provide the selected user with predictive caching of the targeted file on the client devices, the sharing service executes 510 a caching service (e.g., the caching service 110 of FIG. 1).

The caching service predicts 512 a geolocation at which the selected user is most likely to access the selected file. In some examples, the caching service executes a geolocation predictor (e.g., the geolocation predictor 112 of FIG. 1) to predict 512 the geolocation. In these examples, the geolocation predictor receives, processes, and responds to requests generated by the caching service to identify the predicted geolocation at which the selected user is most likely to access the targeted file. These requests can include an identifier of the targeted file and an identifier of the selected user as received by the sharing service from an agent (e.g., the agent 104 of FIG. 1). In response to receiving a request, the geolocation predictor parses the request and executes a prediction process. The prediction process receives the identifiers of the selected user and the targeted file as input and outputs a geolocation at which the selected user is predicted to access the targeted file. The prediction process can be configured to execute any of a variety of prediction/forecasting methods to identify the predicted geolocation. The computational complexity and accuracy of the prediction process varies between examples.

For instance, in some examples, the prediction process simply identifies a geolocation at which the selected user has most frequently accessed the targeted file and records the geolocation as the predicted geolocation. When performing this calculation, the prediction process can filter the historical usage data to include only data that involves the user, peers of the user, and/or files related to the targeted file. In other examples, the prediction process identifies, by interoperating with a calendar service (e.g., the calendar service 124 of FIG. 1) a geolocation at which the user has an appointment scheduled and records the geolocation as the predicted geolocation. In other examples, the prediction process identifies a geolocation at which any members of a peer group including the selected user have most frequently accessed the targeted file and records the geolocation as the predicted geolocation. In these examples, the prediction process identifies the peer group by interoperating with an active directory service (e.g., the active directory service 126 of FIG. 1).

In other examples, where the file has little or no usage history, the prediction process identifies a geolocation at which the selected user has, or members of the peer group have, most frequently accessed a file that resides in the same directory in a file storage (e.g., the file storage 106 of FIG. 1) as the targeted file. In other examples, where the targeted file has little or no usage history, the prediction process identifies a geolocation at which the selected user has, or members of the peer group have, most frequently accessed a file having or including the same name as the targeted file. In other examples, where the targeted file has little or no usage history, the prediction process identifies a geolocation at which the selected user has, or members of the peer group have, most frequently accessed a file being of the same type (e.g. audio, video, etc.) as the targeted file. As the examples above illustrate, various instances of the prediction process can leverage commonalities between the selected user and other users and/or commonalities between the targeted file and other files to predict a geolocation of access where usage data specific to the selected user and/or the targeted file is not available.

While the prediction process described above is based on simple historical frequency analysis, examples of the geolocation predictor are not limited to this technique. For instance, in calculating frequency, the prediction process can assign weight based on recency of usage data and/or on a strength of the commonality between the usage data and the selected user and/or targeted file. Moreover, other types of forecasting/prediction can be executed by the prediction process. For instance, in at least one example, the prediction process executes an artificial neural network trained to identify a predicted geolocation based on usage data of the selected user and/or the peer group in accessing the targeted file and/or other files having some commonality with the targeted file. As will be appreciated in light of the present disclosure, various examples of the prediction process can implement a wide variety of forecasting/prediction techniques.

Continuing the process 500, the sharing service predicts 514 the amount of bandwidth that will be available to download the selected file at the predicted geolocation. In some examples, the caching service executes a bandwidth predictor (e.g., the bandwidth predictor 114 of FIG. 1) to predict 514 the bandwidth. In these examples, the bandwidth predictor receives, processes, and responds to requests generated by the caching service to identify the predicted bandwidth at the predicted geolocation. These requests can include an identifier of the predicted geolocation as received by the caching service from the geolocation predictor. In response to receiving a request, the bandwidth predictor parses the request and executes a prediction process. The prediction process receives the identifier of the predicted geolocation as input and outputs an amount of bandwidth available at the predicted geolocation. The prediction process can be configured to execute any of a variety of prediction/forecasting methods to identify the predicted bandwidth. The computational complexity and accuracy of the prediction process varies between examples.

For instance, in some examples, the prediction process simply identifies an average bandwidth at which files have historically been downloaded to the predicted geolocation and records the average bandwidth as the predicted bandwidth. In these examples, the prediction process can calculate the average bandwidth on the fly and/or identify a previously calculated average bandwidth within a cross-reference stored in the configuration data. Further, the prediction process can filter the historical usage data to include only data that involves the user and/or peers of the user. While this prediction process is based on simple historical frequency analysis, other examples of the bandwidth predictor are not limited to this technique. For instance, in calculating bandwidth, the prediction process can assign weight based on recency of usage data. Moreover, other types of forecasting/prediction can be executed by the prediction process. For instance, in at least one example, the prediction process executes an artificial neural network trained to identify a predicted bandwidth based on usage data (uploads and/or downloads) involving the predicted geolocation. In another example, the prediction process builds a probability distribution function that relates geolocation to bandwidth and evaluates the function using the predicted location. As will be appreciated in light of the present disclosure, various examples of the prediction process can implement a wide variety of forecasting/prediction techniques.

Continuing the process 500, the caching service determines 516 a portion of the targeted file to store in one or more caches local to the one or more client devices associated with the selected user. In some examples, the caching service executes a cache optimizer (e.g., the cache optimizer 116) to determine 516 the portion. In these examples, the optimizer receives, processes, and responds to requests generated by the caching service to identify the portion. These requests can include an identifier of the targeted file and the predicted bandwidth and as received by the caching service from the bandwidth predictor. In response to receiving a request, the optimizer parses the request and executes an optimization process.

To gather the information needed to execute the optimization process, the optimizer transmits, via a system interface of a storage service (e.g., the storage service 120 of FIG. 1), a request for data descriptive of the targeted file. This request can include an identifier of the targeted file. The storage service receives, processes, and responds to the request. Each response can include an identifier of the file and additional data descriptive of the file, such as data descriptive of the size of the file, the path within the file system at which the file resides, the type of data stored in the file, and other information analyzed by the optimizer to identify a portion of the file to download to the cache.

In some examples, the optimization process uses the predicted bandwidth and characteristics of the file to identify a focal point within the file between a starting point and an ending point such that the time required for an application to process the data between the starting point and the focal point equals an amount of time required to download the data between the focal point and the ending point.

In certain examples, the position of a focal point for a given file depends not only on the predicted bandwidth available to download the file but also on the type and amount of data stored in the file. For instance, certain types of files contain portions of data (e.g., video and/or audio data) that can be processed by an application while other portions of the file are downloaded. For these types of files, the optimizer identifies a focal point closer to the starting point of the file than for types of files where the application requires a complete copy of the file to initiate processing.

In some examples, the optimization process is configured to compare the predicted bandwidth to a processing rate of an application used to access the targeted file. In these examples, the configuration data includes a cross-reference of associations between types of data stored in files and processing rates of applications used to access the types of data. The optimization process determines the processing rate by identifying the type of data stored in the targeted file and by identifying an association between the type of data and a processing rate in the cross-reference. Where the predicted bandwidth equals or exceeds the processing rate, the optimization process determines that the portion of the file can include no data. However, where the predicted bandwidth is less than the processing rate, the optimization process executes the calculation of Equation 1 to determine an amount of data to be stored in the portion of the file.

$$\text{Size} = \frac{\text{Rate} - \text{Bandwidth}}{\text{Rate}} * \mathit{Filesize} \qquad \text{Equation 1}$$

where Size=the size of the portion (e.g., in megabytes (MB)), Rate=the processing rate of the application (e.g., in MB/sec.), Bandwidth=the predicted bandwidth (e.g., in MB/sec.), and Filesize=the size of the targeted file (e.g., in MB).

In some examples, Equation 1 is modified to allow for some error in the predicted bandwidth without negatively impacting the user's experience. In these examples, the optimization process executes the calculation of Equation 2 to determine the amount of data to be stored in the portion of the file.

$$\text{Size} = \frac{\text{Rate} - (\text{Bandwidth} - \text{Tolerance})}{\text{Rate}} * \mathit{Filesize} \qquad \text{Equation 2}$$

where Size=the size of the portion (e.g., in MB), Rate=the processing rate of the application (e.g., in MB/sec.), Bandwidth=the predicted bandwidth (e.g., in MB/sec.), Tolerance is a multiple of the standard deviation of the sample used to calculate the predicted bandwidth (e.g., in MB/sec.), and Filesize=the size of the targeted file (e.g., in MB).

In some examples, either Equation 1 or Equation 2 is modified to allow some acceptable latency between reception of a request to access the targeted file and provision of access to the targeted file. In these examples, the optimization process identifies the acceptable latency from the configuration data and executes the calculation of Equation 2 to determine the amount of data to be stored in the portion of the file.

$$\text{Size} = \frac{\text{Rate} - (\text{Bandwidth} - \text{Tolerance})}{\text{Rate}} * \mathit{Filesize} - \text{Latency} * \text{Rate} \qquad \text{Equation 3}$$

where Size=the size of the portion (e.g., in MB), Rate=the processing rate of the application (e.g., in MB/sec.), Bandwidth=the predicted bandwidth (e.g., in MB/sec.), Tolerance is a multiple of the standard deviation of the sample used to calculate the predicted bandwidth (e.g., in MB/sec.), Filesize=the size of the targeted file (e.g., in MB), and Latency=acceptable latency period (e.g., in seconds).

Continuing with the process 500, after completion of the optimization process, the optimizer, caching service, and sharing service interoperate to orchestrate 520 a download of the portion of the file to the one or more caches. During orchestration 520, the optimizer responds to the caching service with information identifying the portion of the targeted file to download to the cache. The caching service, in turn, provides the portion identifying information to the sharing service. The sharing service transmits, to the storage service, a request to download the portion of the file to each agent hosted by one of the client devices associated with the selected user. The storage service responds to this request by generating and transmitting, to the sharing service, an authorization response including one or more unique identifiers (e.g., a hash values) that can be used to download the portion of the file. The sharing service transmits one or more requests authorizing each agent to download the portion of the file.

Next, each agent receives the request authorizing download of the portion from the sharing service and determines 522 whether the size of the portion is greater than the remaining available capacity of the cache. Where the agent determines 522 that the size of the portion is greater than the remaining available capacity of the cache, the agent reorganizes 524 the cache. In some examples, the agent deletes or overwrites files stored in the local cache where the size of the local cache is insufficient to store the portion. In some examples, the agent maintains the local cache as a FIFO queue in which files that are stored first are also deleted first. In other examples, the agent prioritizes retention using recency and/or frequency of access with more recently and/or frequently accessed files being retained over less recently and/or infrequently accessed files. In other examples, the agent priorities retention of files yet to be accessed over files that have been previously accessed. In still other examples, the agent prioritizes retention using predicted bandwidth with files associated with lower predicted bandwidth being retained over files associated with higher predicted bandwidth.

Next each agent interoperates with the storage service to store 518 the portion of the file in the cache. The agent downloads the portion of the file by exchanging messages (e.g., including the unique identifier) with the storage service, thereby completing an automatic synchronization of the file using predictive caching.

The sharing service determines 526 whether the selected user is the final member of the set of identified users. Where the sharing service determines 526 that the selected user is not the final member, the sharing service returns to select 508 the next user. Where the sharing service determines 526 that the selected user is the final member, the sharing service determines 528 whether the selected, targeted file is the final member of the set of targeted files. Where the sharing service determines 528 that the selected file is not the final member of the set of targeted files, the sharing service returns to select 504 the next file of the set of targeted files. Where the sharing service determines 528 that the selected file is the final member of the set of targeted files, the sharing service terminates the process 500.

Process in accordance with the process 500 enable the system 100 to manage the amount of latency perceived by users, as described herein.

Figure 6:
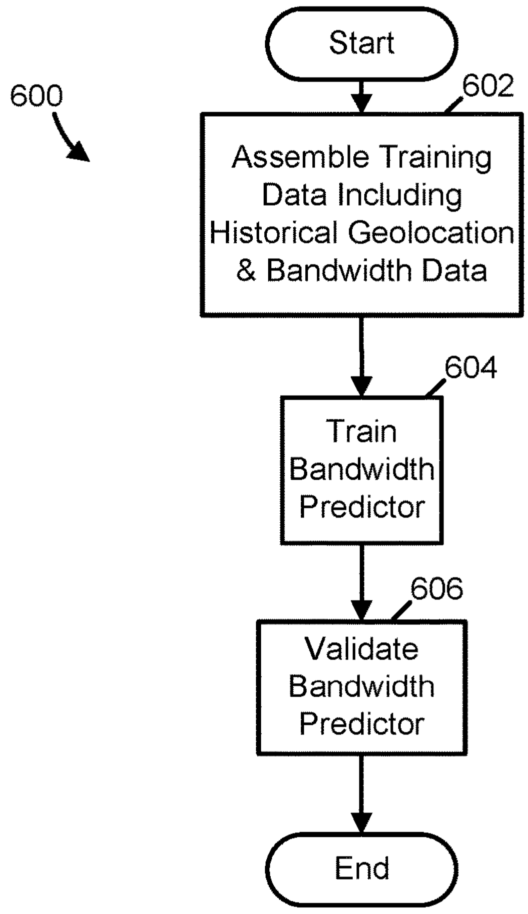
FIG. 6 is a flow diagram of a training process in accordance with an example of the present disclosure.

In various examples disclosed herein, a computing device (e.g., the computing device 301 of FIG. 3) executes a training process to train an artificial neural network (e.g. via back-propagation) to predict bandwidth available at a geolocation. FIG. 6 illustrates one example of this training process 600.

As shown in FIG. 6, the process 600 starts with the computing device assembling 602 training data including historical geolocation and bandwidth data. This data can be retrieved, for example, from a historical data store (e.g., the historical data store 108 of FIG. 1). Next, a portion of this data (e.g., 80%) is used to iteratively train 604 the artificial neural network (via e.g., a back-propagation process) to predict bandwidth based on input including an identifier of the geolocation. Finally, another portion of the data (e.g., 20%) used to validate 606 the trained artificial neural network and the computing device terminates the process 600.

Processes in accordance with the process 600 enable computing devices to generate a set of artificial neural network parameters (e.g., node weights, etc.) that can be loaded by an artificial neural network to enable it to receive, as input, an identifier of a geolocation and to provide, as output, a predicted bandwidth available at the geolocation to download files.

Figure 7:
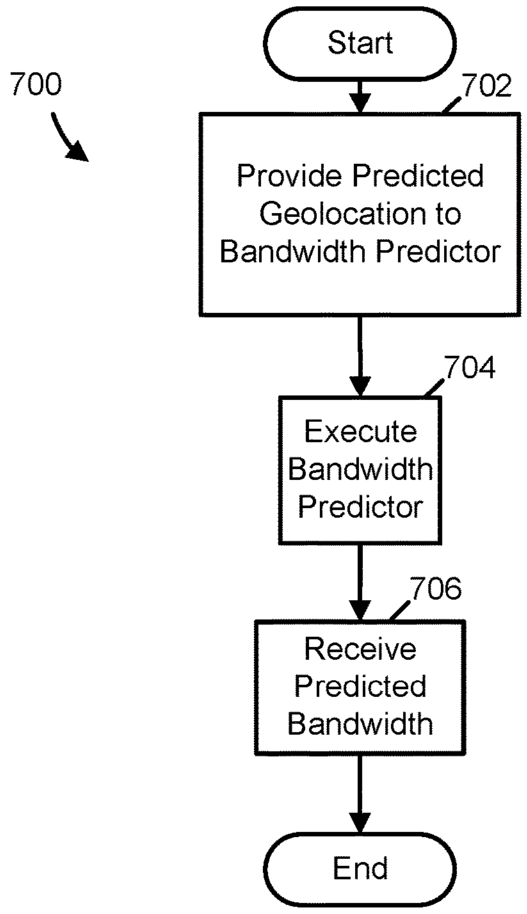
FIG. 7 is a flow diagram illustrating a prediction process in accordance with an example of the present disclosure.

In various examples disclosed herein, a caching service (e.g., the caching service 110 of FIG. 1) executes an artificial neural network to predict bandwidth available at a geolocation. FIG. 7 illustrates one example of this prediction process 700.

As shown in FIG. 7, the process 700 starts with the caching service providing 702 a predicted geolocation to an artificial neural network trained (e.g., via the process 600 of FIG. 6) to predict bandwidth available at a geolocation. The caching service executes 704 the artificial neural network using predicted geolocation as input. The caching service receives 706 output from the artificial neural network that predicts an amount of bandwidth available at the geolocation to download a file.

Processes in accordance with the process 700 enable a caching service to accurately predict bandwidth available for file downloads and, thereby, enable the caching service to provide client devices with predictive caching.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

An additional example in which the order of the acts can be altered will now be presented to further illustrate the scope of the examples disclosed herein. In this example, a mobile user takes her client device to multiple geolocations over the course of a work week. These geolocations include her office, her home, and two customer sites. In each of these places, the user has access to different bandwidths. Table 1 lists a cross-reference that associates the geolocations visited by the user and an average bandwidth calculated by one example of a bandwidth predictor (e.g. the bandwidth predictor 114 of FIG. 1).

TABLE 1

| | | | |
|---|---|---|---|
| Location A | Office | Very high bandwidth | 100 Mbps |
| Location B | Home | Moderate bandwidth | 10 Mbps |
| Location C | Customer Site 1 | Low bandwidth. | 50 Mbps |
| Location D | Customer Site 2 | Low bandwidth. | 3 Mbps |

Further, in this example, the user's client device has insufficient storage available to store two marketing video files that she wishes to show her customers. Both of these files are targeted for automatic synchronization by an enhanced file sharing system (e.g., the enhanced file sharing system 100 of FIG. 1). Table 2 lists characteristics of these files and a predicted location generated by a location predictor (e.g. the location predictor 112 of FIG. 1).

TABLE 2

| Video File Name | Video Quality | Predicted Location |
|---|---|---|
| File F1 | 1080 p | Location C |
| File F2 | 1080 p | Location D |

Further, in this example, configuration data (e.g., the configuration data 122 of FIG. 1) indicates that the processing rate of a video player used to render these files executes at 6 MB/sec.

In this example, an optimizer (e.g., the optimizer 116 of FIG. 1) determines that the portion of targeted file F1 downloaded to the cache of the client device includes no data. This is so because the bandwidth available at Location C is sufficient to support streaming file F1 without unacceptable latency. However, the optimizer determines that the portion of the targeted file F2 downloaded includes 50% of its total data. This is the case because the bandwidth at Location D is insufficient to support streaming without buffering/latency. More specifically, the optimizer determines that, given the difference between the processing rate and the bandwidth, at least 50% of the file F2 should be stored in the cache of the client device. This will enable the user to begin viewing the video stored in the file F2 while the other 50% of the file F2 can be downloaded/streamed in parallel. When the user's review reaches 50% of the video, 75% of the video will be downloaded. By the time she completes the video, she wouldn't have seen any buffering of the video.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system comprising:

a memory;

a network interface; and at least one processor coupled to the memory and the network interface and configured to communicate with an enterprise directory service to authenticate a user of a computing device, identify a file to provide to the computing device, predict, via a neural network machine learning process having weight parameters trained using historical data representative of file access, and based on a geolocation at which peers of the user belonging to a group specified within the enterprise directory service have accessed the file, a geolocation at which the computing device is to request access to the file, predict, based on an average bandwidth at the geolocation in historical data representative of network bandwidth, the historical data filtered to include data specific to the peers of the user belonging to the group specified within the enterprise directory service, the average bandwidth comprising an average bandwidth among the peers belonging to the group, a network bandwidth to be available to the computing device at the geolocation, determine, based on the file and the network bandwidth, a first portion of the file to store in a cache of the computing device, and download, via the network interface, the first portion of the file to the cache.

2. The computer system of claim 1, wherein the at least one processor is further configured to:

receive the file;

receive a request to share the file with the user; and identify an association between the user and the computing device, wherein the at least one processor is configured to identify the file to provide to the computing device in response to receiving the file and/or receiving the request to share the file.

3. The computer system of claim 2, wherein the at least one processor is configured to predict the network bandwidth by identifying the network bandwidth within output from a bandwidth prediction process.

4. The computer system of claim 3, wherein the bandwidth prediction process comprises a machine learning process trained using the historical data representative of network bandwidth, a probability distribution function derived from the historical data representative of network bandwidth, and/or an identification process that accesses a cross-reference associating geolocations with the historical data representative of network bandwidth.

5. The computer system of claim 1, wherein the at least one processor is configured to predict the geolocation by identifying the geolocation within output from a geolocation prediction process comprising the neural network machine learning process.

6. The computer system of claim 5, wherein the geolocation prediction process further comprises, a probability distribution function derived from the historical data representative of file access, and/or an interoperation that identifies the geolocation within a schedule of the user associated with the computing device.

7. The computer system of claim 6, wherein the historical data representative of file access is filtered to include data specific to the user, peers of the user, and/or files related to the file.

8. The computer system of claim 6, wherein the interoperation that identifies the geolocation comprises an interoperation with a calendar service.

9. The computer system of claim 1, wherein the at least one processor is configured to determine the first portion of the file to store in the cache by being configured to:

identify a processing rate of an application used to access to the file;

determine a second portion of the file that can be downloaded to the geolocation having the network bandwidth within a period of time required to process the first portion of the file at the processing rate; and identify the first portion of the file as being a portion of the file other than the second portion of the file.

10. The computer system of claim 9, wherein the file is a video file.

11. The computer system of claim 1, further comprising the computing device associated with the user, the computing device including one or more processors configured to:

receive a message to download the first portion of the file;

determine an amount of unallocated storage available in the cache;

determine whether the amount of unallocated storage is sufficient to store the first portion of the file;

identify, in response to determining that the amount of unallocated storage is insufficient to store the first portion of the file, data stored in the cache having a size sufficient to store, in combination with the amount of unallocated storage, the first portion of the file; and delete the data from the cache.

12. The computer system of claim 11, wherein the one or more processors are configured to identify the data stored in the cache at least in part by identifying data of a previously accessed file.

13. The computer system of claim 1, wherein the at least one processor is configured to communicate with the enterprise directory service via a wired or wireless connection to a Local Area Network, a Wide Area Network, a Personal Area Network, or the Internet.

14. A method of managing cached data, the method comprising:

receiving a file at a first computing device;

receiving a request to share the file with a user;

identifying an association between the user and a second computing device;

predicting, based on a geolocation at which peers of the user belonging to a group specified within an enterprise directory service have accessed the file, a geolocation at which the second computing device is to request access to the file;

predicting, via a neural network machine learning process having weight parameters trained using historical data representative of file access, and based on an average bandwidth at the geolocation in historical data representative of network bandwidth, the historical data filtered to include data specific to the peers of the user belonging to the group specified within the enterprise directory service, the average bandwidth comprising an average bandwidth among the peers belonging to the group, a network bandwidth to be available to the second computing device at the geolocation;

determining, based on the file and the network bandwidth, a first portion of the file to store in a cache of the second computing device;

authenticating, via communication with the enterprise directory service, the user of the second computing device; and downloading the first portion of the file to the cache.

15. The method of claim 14, wherein predicting the network bandwidth comprises identifying the network bandwidth within output from a bandwidth prediction process.

16. The method of claim 15, wherein identifying the network bandwidth comprises executing a machine learning process trained using the historical data representative of network bandwidth, evaluating a probability distribution function derived from the historical data representative of network bandwidth, and/or identifying the network bandwidth within a cross-reference associating geolocations with the historical data representative of network bandwidth.

17. The method of claim 14, wherein predicting the geolocation comprises identifying the geolocation within output from a geolocation prediction process.

18. The method of claim 17, wherein identifying the geolocation within the output comprises executing a machine learning process trained using historical data representative of file access, evaluating a probability distribution function derived from the historical data representative of file access, and/or identifying the geolocation within a schedule of the user.

19. The method of claim 14, wherein determining the first portion of the file to store in the cache comprises:

identifying a processing rate of an application used to access to the file;

determining a second portion of the file that can be downloaded to the geolocation having the network bandwidth within a period of time required to process the first portion of the file at the processing rate; and identifying the first portion of the file as being a portion of the file other than the second portion of the file.

20. The method of claim 14, wherein predicting the network bandwidth to be available to the second computing device at the geolocation comprises predicting the network bandwidth to be available via a wired or wireless connection to a Local Area Network, a Wide Area Network, a Personal Area Network, or the Internet.

* * * * *